Figure 1:
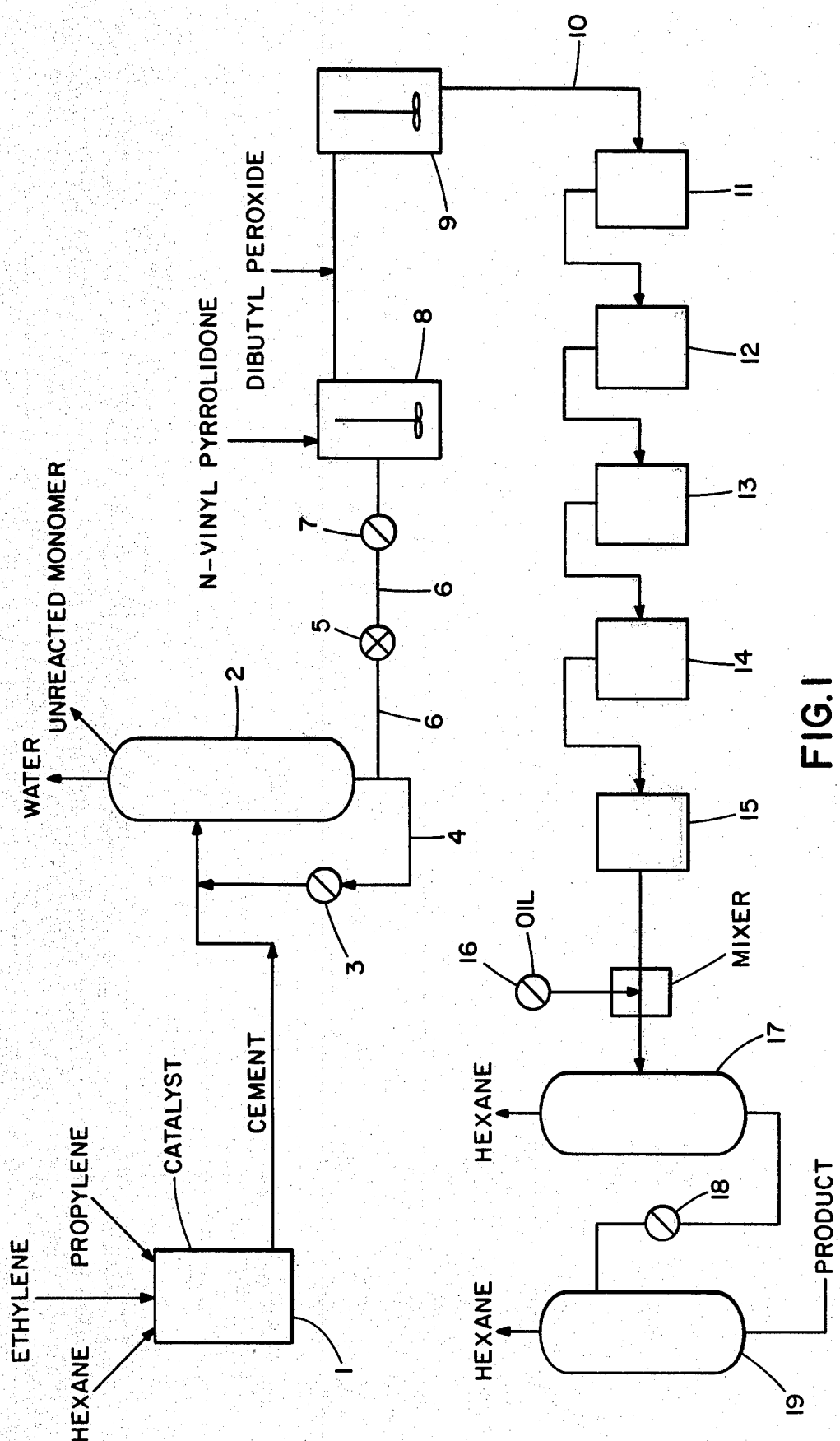

United States Patent [19]

Joffrion

[11] 4,340,689
[45] Jul. 20, 1982

[54] METHOD OF GRAFTING EPM AND EPDM POLYMERS

[75] Inventor: Ralph K. Joffrion, Baton Rouge, La.

[73] Assignee: Copolymer Rubber & Chemical Corporation, Baton Rouge, La.

[21] Appl. No.: 76,386

[22] Filed: Sep. 17, 1979

[51] Int. Cl.³ .................... C08F 255/04; C08F 255/06
[52] U.S. Cl. .................... 525/263; 525/279; 525/283; 525/288; 525/290; 525/322; 525/310; 525/309; 525/296; 525/295
[58] Field of Search ............... 525/263, 279, 283, 290, 525/322, 288, 295, 296, 309, 310

[56] References Cited
U.S. PATENT DOCUMENTS

| | | | |
|---|---|---|---|
| 3,683,050 | 8/1972 | Meredith et al. | 525/288 |
| 3,830,872 | 8/1974 | Schrage et al. | 525/288 |
| 3,868,433 | 2/1975 | Bartz et al. | 525/288 |
| 4,146,489 | 3/1979 | Stambaugh et al. | 525/283 |

Primary Examiner—Carman J. Seccuro
Attorney, Agent, or Firm—McDougall, Hersh & Scott

[57] ABSTRACT

A process for grafting functional organic groups onto EPM and EPDM polymers wherein the grafting reaction is carried out in the cement in which the polymer is originally formed by solution polymerization.

14 Claims, 1 Drawing Figure

METHOD OF GRAFTING EPM AND EPDM POLYMERS

This invention relates to grafted EPM and EPDM polymers and method for producing same.

In U.S. Pat. No. 4,146,489, description is made of EPDM and EPM polymers grafted with C-vinyl pyridine and N-vinyl pyrrolidone for use as an additive to lubricating oils as a viscosity improver and as a dispersant.

Grafting is effected in accordance with the process described in the patent by first breaking down the polymer into small segments or to lower molecular weights for solution in a solvent medium, such as dichlorobenzene. While maintaining the temperature below decomposition temperature for the initiator, the vinyl pyridine or N-vinyl pyrrolidone is added to the solution followed by the addition of the initiator, such as t-butyl perbenzoate. When mixing has been completed, the temperature is raised to decomposition for the initiator, such as 140° C., and held there with possible further additions of initiator for about 1 to 2 hours. Thereafter, the product is vacuum stripped of the solvent and unreacted monomer, leaving the polymer grafted with the vinyl pyridine or N-vinyl pyrrolidone.

The reduction of the solid polymer for dissolution of the polymer in a solvent medium and the removal of the solvent after grafting reaction has been completed represent procedural steps that require additional time and equipment as well as additional labor and materials, with losses of material and product as in incidence to additional processing steps. Further, such degradation of the polymer, before grafting, produces a product having a number of undesirable characteristics.

It is an object of this invention to produce EPM and EPDM polymers grafted with functional groups, such as vinyl pyridine and N-vinyl pyrrolidone, for purposes of enhancing the utility of the grafted polymer for various applications, such as viscosity improver and dispersants, as described in the aforementioned issued patent, and it is a related object to produce grafted EPM and EPDM polymers of the type described by a more efficient and effective procedure which eliminates a number of the procedural steps heretofore employed, which conserves on the materials employed in the practice thereof, which provides for increased yield, and in which the process of grafting can be applied to polymers of a lower molecular weight range than heretofore employed thereby to expand the range of EPM and EPDM polymers capable of being produced with corresponding enlargement in the applications that can be made thereof.

These and other objects and advantages of this invention will hereafter appear, and for purposes of illustration, but not of limitation, an embodiment of the invention is shown in the accompanying drawing in which FIG. 1 is a flow diagram for the preparation of grafted EPM and EPDM polymers in accordance with the practice of this invention.

Briefly described, an important concept of this invention resides in the modification in the procedure for the manufacture of the EPM and EPDM polymers to iclude grafting the polymer after it is formed to the desired molecular weight level but before it is removed from the cement whereby the grafting reaction can be carried out on polymers of very low as well as high molecular weight, with elimination of a number of procedural steps and corresponding savings of materials, time, labor and equipment, and with greater flexibility for grafting a wider range of groupings onto the polymer thereby to enable the production of an improved grafted polymer at lower cost, in a wider range of products for expanded use.

The invention will hereinafter be described with reference to the production of an EPM copolymer and EPDM interpolymer grafted with N-vinyl pyrrolidone for addition to lubricating oils as a viscosity improver and dispersant. It will be understood that a wide variety of monomers and other compounds can be grafted onto the polymer in accordance with the practice of this invention to produce grafted EPM and EPDM polymers having a wide variety of applications other than viscosity improvers for lubricating oils, some of which will hereinafter be described.

EPM polymers are formed by interpolymerization of monomers of ethylene and one or more higher mono-olefins having from 3 to 16 carbon atoms, preferably propylene. EPDM interpolymers are formed of the same ethylene, one or more higher mono-olefins as described above, plus one or more polyenes. The polyene monomers may be selected of branched chain monomers, straight or branched chain polyene or cyclic polyenes containing 4 to 20 carbon atoms and preferably 5 to 10 carbon atoms and two carbon to carbon double bonds. The preferred straight chain polyene is 1,4-hexadiene but other straight chain dienes can be used, such as discussed in U.S. Pat. No. 3,884,993.

The polyene or other ethylenically unsaturated compound containing a plurality of carbon-to-carbon double bonds may be selected from those disclosed in the prior art for use as third monomers in the preparation of ethylene-propylenepolyene terpolymers, including open chain polyunsaturated hydrocarbons containing 4–20 carbon atoms, such as 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo (2,2,1) heptane wherein at least one double-bond is present in one of the bridged rings, such as dicyclopentadiene, bichclo(2,2,1)hepta-2,5-diene, the alkylidene norbornenes, and especially the 5-alkylidene-2-norbornes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged ring hydrocarbons include polyunsaturated derivatives of bicyclo(2,2,2) octane as represented by bicyclo(2,2,2) octa-2,5-diene, polyunsaturated derivatives of bicyclo(3,2,1) octane, polyunsaturated derivatives of bicyclo(3,3,1) nonane, and polyunsaturated derivatives of bicyclo(3,2,2) nonane.

Specific examples of preferred bridged ring compounds include 5-methylene-2-norbornene, 5-ethylidene-2-norbornene, 5-n-propylidene-2-norbornene, 5-isopropylidene-2-norbornene, 5-n-butylidene-2-norbornene, 5-isobutylidene-2-norbornene, dicyclopentadienes; the methyl butenyl norbornenes such as 5-(2-methyl-2-butenyl)-2-norbornene or 5-(3-methyl-2-butenyl)-norbornene, and 5-(3,5-dimethyl-4-hexenyl)-2-norbornene. The elastomer prepared from 5-ethylidene-2-norbornene is much preferred as it has outstanding properties and produces many unusual and unexpected results.

The elastomer may contain chemically bound therein molar ratios of ethylene to propylene varying between 95:10 ethylene to 5:90 propylene, and preferably between 70:30 ethylene to 55:45 propylene. The polyene or substituted polyene may be chemically bound therein to replace the ethylene or propylene in an amount of 0.1 to 10 mole percent, and preferably 0.3 to 1 mole percent, or in an amount to provide an actual unsaturation level of 2 double bonds per 1,000 carbon atoms in the polymer chain to unsaturation level as high as 100 double bonds per 1,000 carbon atoms in the polymer.

The interpolymerization reaction is carried out in the presence of a catalyst in a solvent medium. The polymerization solvent may be any suitable inert organic solvent that is liquid under reaction conditions and it may be a prior art solvent for solution polymerization of monoolefins in the presence of Ziegler type catalyst. Examples of satisfactory hydrocarbon solvents include straight chain paraffins having from 5–8 carbon atoms, with best results often being secured by the use of hexane; aromatic hydrocarbons and preferably an aromatic hydrocarbon having a single benzene nucleus, such as benzene, toluene and the like; and saturated cyclic hydrocarbons having boiling point ranges approximating those of the straight chain paraffin hydrocarbons and aromatic hydrocarbons described above, and preferably saturated cyclic hydrocarbons having 5–6 carbon atoms in the ring nucleus. The solvent selected may be a mixture of one or more of the foregoing hydrocarbons and preferably a mixture of aliphatic and naphthenic hydrocarbons having approximately the same boiling range as normal hexane. It is desirable that the solvent be dry and free of substances that will interfere with the Ziegler type catalyst used in the polymerization reaction.

Ziegler catalysts of the type well known to the prior art may be used. Such Ziegler type catalysts are disclosed in a large number of patents, such as U.S. Pat. Nos. 2,933,480, 3,093,620, 3,093,621, 3,211,709 and 3,113,115. Examples of Ziegler catalysts include metal organic coordination catalysts prepared by contacting a compound of a heavy metal of the group IV-a, V-a, VI-a and VII-a of the Mendeleeff periodic system of elements, such as titanium, vanadium and chromium halides with an organo-metallic compound of a metal of groups I, II or III of the Medeleeff periodic system which contains at least one carbon-metal bond, such as trialkyl aluminum, and allyl aluminum halides in which the alkyl groups contain from 1–20 and preferably 1–4 carbon atoms.

The preferred Ziegler catalyst for interpolymerization to product EPDM or EPM polymers is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of U.S. Pat. No. 3,113,115, general formula $R_1AlCl_2$ and $R_2AlCl$ and the corresponding sesquichlorides of the general formula $R_3Al_2Cl_3$, in which R is methyl, ethyl, propyl, butyl or isobutyl. In the catalyst system, the aluminum to vanadium mole ratio of the aluminum and vanadium compounds may be within the range of 5/1 to 200/1 and preferably within the range of 15/1 to 60/1, with best results being secured in the ratio of 40 aluminum to 1 vanadium. These same ratios apply with respect to corresponding compounds of others of the heavy metals substituted for the vanadium compound and the organo-metallic compounds of groups, I, II or III for the aluminum compounds. A catalyst prepared from alkyl aluminum sesquichloride, such as the methyl or ethyl aluminum sesquechloride and vanadium oxychloride is preferred in the ratio of 1 mole vanadium oxychloride per 5–300 moles of aluminum and more preferably 15–60 moles of aluminum, with 40 moles of aluminum per mole of vanadium yielding the best results.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer. The polymerization is carried out in a liquid phase in the organic solvent in the presence of a Ziegler catalyst. The solution of elastomer in the polymerization solvent is withdrawn continuously from the reaction vessel, the catalyst is killed by the addition of a catalyst deactivator.

For use in the practice of this invention, it is preferred to make use of the low molecular weight polymers for grafting, especially for use with lubricating oils as viscosity improvers characterized by new dispersant properties. Such low molecular weight EPM and EPDM polymers are characterized by an average molecular weight less than 25,000 and preferably less than 15,000, but the grafting procedure of this invention can also be practiced with higher molecular weight EPM and EPDM polymers, especially when used for other purposes such as blending with other polymeric or resinous materials to introduce properties such as improved flexure stength, impact strength, ozone resistance and wear. When expressed on the basis of intrinsic viscosity, such low molecular weight EPM and EPDM polymers may range from 0.4 to 1.7 RSV.

The preparation of EPM and EPDM polymers is well known and is fully described in such patents as U.S. Pat. Nos. 2,933,480; 3,093,621; 3,211,709; 3,646,168; 3,790,519; 3,884,993; 3,894,999; 4,059,654, amongst many others.

The following are typical examples for the preparation of a low molecular weight EPDM and EPM polymer:

EXAMPLE 1

In reactor 1, 1 liter of hexane is introduced into the reaction vessel. As the temperature is raised to 30° C., dry propylene was fed to the reactor until 42.2 inches of mercury pressure was reached. The pressure was then raised to 61 inches of mercury with a feed of dry ethylene and 6.03 millimoles (1.63 cc) of 5-ethylidene-2-norbornene and 1 cc of 1.5 molar ethyl aluminum sesquchloride were added.

The monomer feeds were stopped and the catalyst component, i.e. 0.545 molar solution of ethyl aluminum sesquichloride and 0.054 molar solution of vanadium oxytrichloride, at a 12 to 1 aluminum to vanadium ratio, were fed into the reactor at constant rate until a drop in pressure was noted. At this time, the gaseous monomers were fed into the reactor at a rate of 1501 cc per minute of which 692 cc were ethylene and 809 cc were prolylene. The 5-ethylidene-2-norbornene was added as a 0.3 molar solution in hexane which also was 0.01 molar in pyridine, at a rate of 3.57 cc per minute to provide about 8.6% by weight for incorporation into the interpolymer. The polymerization was controlled by the catalyst pumps which added catalyst on demand in response to increased pressure. When the solution in the reactor contained 10% polymer, fresh solvent containing 16 cc of ethylene per cc of solvent was introduced into the reactor at the rate of 26.5 cc per minute and polymer cement was taken off continuously to produce 9.4 grams of polymer per hour.

At this time, the ethylene and propylene feeds were adjusted to 310 cc per minute and 1645 cc per minute, respectively, to compensate for the unreacted monomers removed with the cement. The feed rate of solution of 5-ethylidene-2-norbornene was adjusted to 4.23 cc per minute.

The resulting interpolymer contained ethylene and propylene in a ratio of 59 mole percent of chemically bound ethylene to 41 mole percent of chemically bound propylene and the molecular weight of the interpolymer, as measured by specific viscosity of 0.1% solution in Decalin at 135° C. was 1.88.

The level of unsaturation, based upon the amount of chemically bound 5-ethylidene-2-norbornene in the polymer was 10 carbon-to-carbon double bonds per 1,000 carbon atoms.

EXAMPLE 2

Into the reactor 1, ethylene at a rate of 17.6 lbs./hr. propylene at a rate of 62.3 lbs./hr. and hexane at a rate of 567 lbs./hr. are introduced with vanadium oxytrichloride catalyst at a rate of 0.063 lbs./hr. ethyl aluminum sesquichloride co-catalyst at a rate of 2 lbs./hr. and butyl perchlorocrotonate promoter at a rate of 0.25 lbs./hr. until 60° C. under 40 p.s.i.g. is reached to produce a low molecular weight EPM having a Mooney viscosity of less than 1($ML_{1+8}$ at 300° F.) and containing approximately 0.41% ethylene and 59% propylene bound in the EPM polymer.

In either of the examples, after the cement is drawn off from the polymerization vessel 1, the catalyst is killed by the addition of water and the admixture is subjected to high agitation to transfer the catalyst to the water phase. The mixture is then led to a decanter wherein the water phase is separated from the solvent phase containing 10% by weight of polymer in hexane.

In accordance with the practice of this invention, the manufacture of EPM or EPDM polymers is interrupted at the cement stage and the grafting reactions are carried out on the polymer while in solution in the solvent in which the monomers are polymerized. This enables the grafting reaction to be performed on polymers having a molecular weight measuring as low as 0.4 RSV without the need to subject the formed polymer to degradation for reduction of molecular weight for solubilization. This enables use of a solvent system wherein the solvent component can enter into the grafting reaction and it makes a more desirable EPM or EPDM backbone polymer available for the grafting of various groupings thereon for new and useful applications.

EXAMPLE 3

This example illustrates the practice of this invention by grafting N-vinyl pyrrolidone onto the backbone polymer, such as the EPDM of Example 1 or the EPM of Example 2, reference being made to the flow diagram.

From the polymerization vessel 1, and after decanting to separate the water phase with the dissolved catalyst from the solution of polymer in hexane, the cement is concentrated in a flash concentrating vessel 2 maintained at a temperature of 190° F. and 20 p.s.i.g. by recirculation of the cement through a heat exchanger 3. Since the cement stream from the decanter is still saturated with water, it is desirable to heat the cement stream by recycle from the concentrator 2 wherein the water is flashed off so that no water is present in the recycle stream to raise problems in the heat exchanger. The temperature is maintained in the concentrator 2 by control of the amount of recycle in line 4 through the heat exchanger 3 which, in turn, is responsive to the density of the cement stream. The pressure in the concentrator 2 is maintained so that the temperature in the vessel is below the boiling point of the solution and preferably close to the boiling point of hexane.

Unreacted monomer, water and some solvent is flashed off in the concentrator 2. Concentration is highly desirable for maximizing grafting efficiency and for minimizing the formation of undesirable byproducts during the subsequent grafting reaction. The higher concentration is selected at a level to optimize the heat transfer coefficient and flow characteristics of the stream through the various processing units. In this example, the cement is concentrated to a dissolved polymer content of about 15% in hexane. The concentration of polymer can be varied by adjustment of the temperature of the material introduced into the concentrator.

A stream is bled from the concentrator 2 and forwarded by pump 5 through line 6 to a heat exchanger 7 where the stream is raised to a temperature of 300°–305° F. and 280 p.s.i.g. The balance of temperature and pressure is maintained so as to minimize exchanger fouling. From the heat exchanger 7, the stream is advanced to a mixer 8 for admixture with the graft monomer such as N-vinyl pyrrolidone introduced into the mixer in the ratio of 1–5 parts by weight of N-vinyl pyrrolidone per 1 part by weight of the polymer in solution.

The catalyst (dibutyl peroxide) is added to the stream as it is led from the mixer 8 to a mixer 9 for admixture of the added catalyst. The catalyst is preferably added in the ratio of 1 part by weight peroxide catalyst to 2 parts by weight of monomer but the ratio of catalyst to monomer can be varied within the range of 1 part by weight of catalyst to 3 parts by weight of monomer to 1 part by weight of catalyst per 1 part by weight of monomer. When the ratio is less than 1 part by weight of catalyst per 3 parts by weight of monomer, the reaction becomes insufficient. At the preferred ratio of 1 part by weight catalyst per 2 parts by weight monomer all of the catalyst is used up in the subsequent grafting reaction. When the amount of catalyst is increased, catalyst remains to cause cross linking of the polymer. When the ratio exceeds 1 to 1, the amount of cross linking becomes excessive.

The mixture is advanced from the mixer 9 through line 10 to the grafting reactor. In the illustrated modification, the reactor is shown as a multiple stage reactor 11, 12, 13, 14 and 15, connected in series for continuous operation. The temperature is controlled in the various stages. Since the initial grafting reaction is exothermic, heat is removed from the first stages and since the amount of heat loss is greater than the amount generated in the later stages of the grafting reaction, heat is added to the later stages. If, instead of a multiple stage reactor, use is made of a single batch reactor, the reactor should be jacketed for the circulation of heat transfer fluid to remove heat during the initial stages of the reaction and to add heat during the final stages of the reaction for induction or grafting of the monomer to provide modifying groups on the polymer. The temperature is controlled so that the grafted polymer issuing from the final stage of the reactor is still at about 300°–305° F. and 20 p.s.i.g.

The next step is to eliminate the solvent. When the grafted polymer is to be used as a viscosity improver, an amount of solvent neutral oil (100 oil) is added to the mixer after being preheated by preheater 16 to about 335° F. The added oil should be a paraffinic oil corresponding to the lubricant to which the grafted polymer is to be added as a viscosity improver.

The mixture is then fed into a deflasher 17 wherein the pressure is dropped to 2 p.s.i.g. at 300° F. to flash off hexane at 50 p.s.i.g. This leaves a product to be drawn from the deflasher 17 containing 2 parts by weight of hexane per 4 parts by weight of polymer and 1 part by weight of polymer per 6 parts by weight of oil.

The effluent from the deflasher 17 is reheated by passing through a heat exchanger 18 before entry into a second stage deflasher 19 at 28 inches of mercury and 370° F. wherein the remainder of the hexane is flashed off leaving a product that is removed from the deflasher containing about 15% by weight of grafted polymer in oil.

The process of this invention, as described, can be used to graft various other functional groups onto the EPM or EPDM polymers for various applications. For example, active silane functionalities, such as Si-X, Si-(OR), SiH, SiOH, $SiNH_2$, in which X is a halogen and R is an organic, aliphatic, aromatic, heterocyclic or cyclic grouping, can be grafted onto the EPM and EPDM backbone polymers as by substitution of a corresponding silane monomer containing the desired functional grouping for the N-vinyl pyrrolidone in corresponding amounts, in Example 3. The preferred functional silane monomer is one containing an unsaturated aliphatic group attached to the silicon atom, such as vinyl trichlorosilane, vinyl trimethoxysilane, vinyl triethoxysilane, vinyl triacetoxysilane, vinyl tris(methoxyethoxy) silane, or the backbone polymer can be grafted with other silane compounds having functional groupings, such as gamma aminopropyltriethoxy sila, mercapto propyltrimethoxy silane, methyl dichloro silane, etc. Modification of the EPM or EPDM polymer to incorporate an unsaturated silane by grafting provides a low temperature vulcanizable EPM and EPDM polymer.

Monomers or compounds containing polar groups such as amino groups can be grafted onto the backbone EPM or EPDM polymer by substitution for the N-vinyl pyrrolidone in corresponding amounts in Example 3. Such grafted polymers can thus be adapted for blending with other polar polymers such as nylon, polyesters, polyvinylidene chloride and the like to improve low temperature and impact properties of the other polymer. The addition of a polar function by grafting onto an EPM or EPDM backbone makes the grafted EPM or EPDM more compatible with such polar polymer to permit combinations that were not heretofore possible in the development of polymers having new and novel characteristics. The following are representative of such other compounds having functional or polar groupings which may be grafted onto the backbone polymer in accordance with the practice of thie invention, namely dimethylaminoethyl methacrylate or acrylate, vinylimidazole, N-vinylcarbazole, N-vinylcarbazole, N-vinylsuccinimide, acrylonitrile, o-, m- or p-aminostyrene, maleimide, N-vinyl ozazolidone, N,N-dimethylaminoethyl vinyl ether, ethyl 2-cyanoacrylate, vinyl acetonitrile, N-vinylphthalimide, and 2-vinylquinoline; a variety of acrylamides and methacrylamides such as N-[1,1-dimethyl-3-oxobutyl] acrylamide, N-[dimethyl-1-ethyl-e-oxobutyl] acrylamide, N-(1,3-diphenyl-1-methyl-3-oxopropyl)acrylamide, N-(methyl-1-phenyl-3-oxobutyl)methacrylamide, N,N-diethylaminoethyl acrylamide; and 2-hydroxyethyl acrylamide. A variety of N-vinylcaprolactams or their thio-analogs, other than or in addition to N-vinylpyrrolidone, may be used in minor amounts. These include N-vinylthiopyrrolidone, 3-methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, 4,5-dimethyl-1-vinylpyrrolidone, 5,5-dimethyl-1-vinylpyrrolidone, 3,3,5-trimethyl-1-vinylpyrrolidone, 4-ethyl-1-vinylpyrrolidone, 5-methyl-5-ethyl-1-vinylpyrrolidone, 3,4,5-trimethyl-3-ethyl-1-vinylpyrrolidone, and other lower alkyl substituted N-vinylpyrrolidones; N-vinylbenzyldimethylamine, N-dimethylaminopropyl acrylamide and methacrylamide, N-methacryloxyethylpyrrolidone, N-methacryloxyethylmorpholinone, N-methacryloxyethylmorpholine, N-maleimide of dimethylaminopropylamine, and the N-methacrylamide of aminoethyethylneurea.

It will be understood that any monomer containing reactive carbon-to-carbon double bond and the desired reaction grouping can be grafted in the manner described onto EPM or EPDM backbone polymer.

The molecular weight range of the EPM and EPDM, which may be employed in the practice of this invention, ranges from the very low molecular weight polymer of almost liquid consistency having a RSV of 0.2. Actually there is no limitation on the RSV of the polymer, however it is impractical to make use of a RSV less than 0.2 since recovery of polymer becomes difficult. The preferred for use as a viscosity improver will be in the range of about 1.0 to 2.0 RSV.

The EPM or EPDM capable of being employed in the practice of the invention includes EPM or EPDM of the type heretofore described having a molar ratio of 95-10 ethylene to 5-90 propylene or other $C_{3-16}$ olefin in the EPM and up to 10-15 moles polyene in the EPDM.

Instead of hexane, use can be made of any basic aliphatic solvent in which the monomer and the formed polymer are soluble, as represented by pentane, octane, chlorinated hydrocarbon solvents such as dichloropentane, dichlorohexane and the like, and cyclic solvents such as cyclohexane, cyclopentane and the like.

In the concentration step, benefit is derived by maximizing the concentration consistent with the flow properties of the resulting polymer solution. The higher the concentration, the more efficient the grafting reaction and the more efficient the utilization of the catalyst, while minimizing the formation of undesirable by-product. The degree of concentration will depend in part on the molecular weight of the polymer dissolved in the organic solvent in that higher concentration of up to about 70% by weight can be utilized with low molecular weight EPM or EPDM polymers while lesser amounts up to 20% by weight are permissible with higher molecular weight polymers. A concentration of preferably more than 5% by weight polymer in solution is desired.

The t-butyl peroxide catalyst in Example 3 can be replaced in whole or in part with other peroxide catalysts such as dicumyl peroxide, benzoylperoxide, t-butylperoctoate, di-t-butylperoxide, t-butylhydroperoxide, cumene hydroperoxide, t-butyl perbenzoate, or other free radical source capable of hydrogen abstraction, as represented by alkyl peroxy exters, alkyl peroxides, alkyl hydroperoxides, diacyl peroxide and the like. The catalyst may be used in the amount described in Example 3.

In practice, use is made of a reaction temperature far above the decomposition temperature for the catalyst which is introduced directly into the mixture at reaction temperature, but if the monomer has first been admixed with the polymer solution the rate of addition of the peroxide catalyst is a function of the monomer.

The reaction time depends somewhat on the solvent and the half life of the catalyst at a given reaction temperature. The aim is for a reaction time of about 3 to 8 half lives in about 1 hour. For example, with dicumyl peroxide, reaction at a temperature below 285° F. is so slow as to yield very poor results, yet at 315° F. the reaction is so rapid as to become inefficient. Too slow a reaction reduces the amount of monomer grafted onto the polymer and the formation of excessive amounts of homopolymer. Reduction in the amount of catalyst reduces the amount of graft.

In general it is desirable to make use of the catalyst in an amount within the range of 1 part by weight catalyst per 3 parts by weight monomer or other grafting compound and preferably in the amount within the range of 1 part by weight catalyst to 2 parts by weight of monomer. When the ratio is less than 1 part by weight catalyst per 3 parts by weight monomer, the grafting reaction becomes inefficient and when the ratio exceeds 1 part by weight catalyst per 1 part by weight of monomer an undesirable amount of cross linking of the polymer takes place.

With 15-30% by weight EPM or EPDM polymer dissolved in the hexane, the amount of monomer grafted onto the polymer will range from 1-2% by weight of the polymer. The bulk of the rest of the monomer will become grafted onto the solvent, homopolymerized or remain unreacted.

The grafted polymers of Example 3 are added as viscosity improvers to lubricating oils in an amount within the range of 5-15% by weight of the oil.

As used herein, the term RSV is a standard viscosity measurement for estimating molecular weight and it relates to the intrinsic viscosity measured in Decalin at 135° C.

It will be understood that changes may be made in the details of formulation and operation without departing from the spirit of the invention, especially as defined in the following claims.

I claim:

1. A process for grafting onto EPM and EPDM backbone polymers formed by solution polymerization in the presence of a Ziegler type catalyst in which the solution polymerization reaction is terminated in a cement stage with the polymer that is formed remaining in solution in the polymerization solvent, the steps of introducing into the cement a grafting compound in the form of an organic compound containing polar groups, introducing into the cement a catalyst in the form of a free radical initiator capable of hydrogen abstraction for admixture with the cement while the cement is at reaction temperature far above the decomposition temperature for the catalyst.

2. The process as claimed in claim 1 which includes the step of concentrating the cement for the removal of unreacted monomer, water and some of the organic solvent before admixture of the catalyst and grafting compound.

3. The process as claimed in claim 2 in which the grafting compound is admixed with the cement in an amount within the ratio of 1-5 parts by weight grafting compound per 1 part by weight polymer.

4. The process as claimed in claim 1 in which the free radical initiator capable of hydrogen abstraction is a peroxide catalyst.

5. The process as claimed in claim 4 in which the catalyst is admixed into the cement in the ratio of 1 part by weight of catalyst to 1-3 parts by weight of the grafting compound.

6. The process as claimed in claim 1 in which the polymer in the cement has a molecular weight within the range of 0.2 to 3.0 RSV.

7. The process as claimed in claim 1 in which the polymer in the cement has a molecular weight above 0.4 RSV.

8. The process as claimed in claim 1 in which the solvent is selected from the group consisting of an aliphatic solvent, a cycloaliphatic solvent and halogenating derivatives thereof.

9. The process as claimed in claim 1 in which the grafting reaction is continued for at least 3 half lives of the catalyst.

10. The process as claimed in claim 1 in which the grafting compound is an ethylenically unsaturated compound containing polar groups.

11. The process as claimed in claim 10 in which the compound is selected from the group consisting of N-vinyl pyridine and N-vinyl pyrrolidone.

12. The process as claimed in claim 10 in which the grafting compound is an organic amino compound.

13. The process as claimed in claim 10 in which the grafting compound is an unsaturated organo silane.

14. The process as claimed in claim 1 in which the polymerization reaction is carried out with hexane as a solvent and the grafting reaction is carried out with the cement in which the polymer remains dissolved in the hexane.

* * * * *